(12) United States Patent
Hadji et al.

(10) Patent No.: US 10,677,139 B2
(45) Date of Patent: Jun. 9, 2020

(54) HOLDING DEVICE FOR AN EXHAUST SYSTEM

(71) Applicant: VIBRACOUSTIC GMBH, Darmstadt (DE)

(72) Inventors: Mohamed Hadji, Freiburg (DE); Alexandre Tenailleau, Saint-Sebastien-sur-Loire (FR)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/083,119

(22) PCT Filed: Mar. 7, 2017

(86) PCT No.: PCT/EP2017/055346
§ 371 (c)(1),
(2) Date: Sep. 7, 2018

(87) PCT Pub. No.: WO2017/153419
PCT Pub. Date: Sep. 14, 2017

(65) Prior Publication Data
US 2019/0024568 A1    Jan. 24, 2019

(30) Foreign Application Priority Data

Mar. 8, 2016   (DE) ........................ 10 2016 104 211

(51) Int. Cl.
*F16L 55/035*    (2006.01)
*F01N 13/18*    (2010.01)
*B60K 13/04*    (2006.01)

(52) U.S. Cl.
CPC .......... *F01N 13/1822* (2013.01); *B60K 13/04* (2013.01); *F16L 55/035* (2013.01); *F01N 2450/18* (2013.01); *F01N 2530/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,944,177 A | * | 3/1976 | Yoda | F16L 3/08 248/74.2 |
| 4,437,633 A | * | 3/1984 | Andre | B60R 16/0215 248/68.1 |
| 5,257,768 A | * | 11/1993 | Juenemann | F16L 55/035 248/604 |

(Continued)

FOREIGN PATENT DOCUMENTS

| | | |
|---|---|---|
| DE | 2455866 A1 | 6/1975 |
| DE | 102006010973 A1 | 9/2007 |

(Continued)

OTHER PUBLICATIONS

English Translation of the International Search Report, PCT/EP2017/055346, dated Apr. 26, 2017.

*Primary Examiner* — Monica E Millner
(74) *Attorney, Agent, or Firm* — Fishman Stewart PLLC

(57) ABSTRACT

A holding device for retaining an exhaust pipe of an exhaust system with a mounted supporting device includes a carrying portion for accommodating the supporting device, and a fastening portion for fastening the holding device to a vehicle. In an embodiment, the fastening portion has a spring member with a snap-in hook for forming a snap-in connection.

10 Claims, 4 Drawing Sheets

(56) References Cited

U.S. PATENT DOCUMENTS

| | | | | |
|---|---|---|---|---|
| 5,354,021 A * | 10/1994 | Farrell | | F16L 3/233 |
| | | | | 24/16 PB |
| 6,209,827 B1 * | 4/2001 | Kawai | | F16B 21/02 |
| | | | | 248/49 |
| 6,405,826 B1 * | 6/2002 | Bass | | B60K 13/04 |
| | | | | 181/228 |
| 6,669,149 B2 * | 12/2003 | Akizuki | | H02G 3/26 |
| | | | | 248/222.12 |
| 6,926,237 B2 | 8/2005 | Shereyk et al. | | |
| 7,055,783 B2 * | 6/2006 | Rosemann | | B60R 16/0215 |
| | | | | 24/297 |
| 7,219,931 B2 * | 5/2007 | Kato | | B60R 16/0207 |
| | | | | 248/60 |
| 7,549,613 B1 * | 6/2009 | Ismert | | F16L 3/085 |
| | | | | 248/73 |
| 8,833,706 B2 * | 9/2014 | Elsmore | | H02G 3/32 |
| | | | | 138/106 |
| 9,083,169 B2 * | 7/2015 | James | | H02G 3/32 |
| 9,512,940 B2 * | 12/2016 | Blakeley | | H02G 3/32 |
| 2003/0057348 A1 | 3/2003 | Arciero et al. | | |
| 2014/0265076 A1 * | 9/2014 | Weger | | F16L 55/02 |
| | | | | 267/141 |
| 2015/0083462 A1 * | 3/2015 | Yoshida | | F16B 2/06 |
| | | | | 174/136 |

FOREIGN PATENT DOCUMENTS

| | | |
|---|---|---|
| DE | 112006002536 T5 | 8/2008 |
| DE | 102010028084 A1 | 10/2011 |
| DE | 102012105023 A1 | 12/2013 |
| EP | 2666988 A1 | 11/2013 |
| WO | 2011018605 A1 | 2/2011 |

* cited by examiner

HOLDING DEVICE FOR AN EXHAUST SYSTEM

CROSS-REFERENCE TO RELATED APPLICATION

This application is a National Stage patent application of International Patent Application No. PCT/EP2017/055346, filed Mar. 7, 2017, which claims the benefit of German Application Serial No. 10 2016 104 211.0, filed Mar. 8, 2016, the contents of each are incorporated by reference in their entireties.

TECHNICAL FIELD

The invention relates to a holding device for retaining an exhaust pipe of an exhaust system by means of a mounted supporting device, including a holding device comprising a carrying portion for accommodating the supporting device, and a fastening portion for fastening the holding device to a vehicle.

BACKGROUND

Holding devices serve for mounting the exhaust pipe relative to the vehicle. A collision of the exhaust pipe with parts of the vehicle due to mechanical vibrations and/or shocks is to be avoided. Such shocks may be produced, for example, if the vehicle drives over road bumps, e.g. potholes. Furthermore, such holding devices are used for pre-assembling parts of an exhaust system and thus simplifying the final assembly.

A holding device for an exhaust system having a body made from an elastic material, for example, is known from EP 2 666 988 A1. Openings are provided in the body, into which portions of the vehicle and of the exhaust system are respectively inserted.

The invention is based on the object of developing a holding device of the type mentioned in the introduction in such a way that the assembly of the holding device on the body of the vehicle is simplified.

SUMMARY

A holding device for retaining an exhaust pipe of an exhaust system comprises a carrying portion for accommodating the supporting device, and a fastening portion for fastening the holding device to a vehicle, wherein the fastening portion has a spring member with a snap-in hook for forming a snap-in connection.

The solution according to the invention is advantageous, in particular, in that no additional tool is required for mounting the holding device. In addition, an at least preliminary orientation and fixation of the holding device is obtained in a simple manner by means of the snap-in connection. Given an appropriate dimensioning of the snap-in connection, additional fastening may also be dispensable. Usually, snap-in connections are detachable, so that recycling is also made easier.

Advantageous embodiments are the subject matter of the disclosure.

The fastening portion may have two spring members. Such a configuration with two spring members simplifies a reliable design of the snap-in connection.

The snap-in hooks of the spring members can be oriented in opposite directions. Since the deflections of the two snap-in hook are thus opposite to one another, the snap-in hooks mutually bias each other in the state of being snapped in place. This improves the durability of the connection, and the shock resistance is increased. Furthermore, the precision of the orientation of the holding device is improved, whereby the holding device is prevented from being rotated. The desired position is also obtained more precisely.

The spring members may be oriented parallel to one another. This brings about an additionally improved durability.

The spring member may be disposed so as to protrude from the fastening portion on a side facing away from the carrying portion. This permits a clear separation in space of the two portions.

The carrying portion may have an opening for accommodating the support device. The opening permits not only the assembly of the supporting device within the carrying portion, but also has additional space for integrating a mounting means for the supporting device, for example. An improved mounting and vibration decoupling of the supporting device is thus obtained.

The opening may have a circular cross section. The resulting shape of an inner wall of the carrying portion can thus be processed easily, and a uniform load distribution, e.g. by means of an elastomer spring integrated into the opening.

The carrying portion may have reinforcing ribs on an outer face. The strength of the carrying portion is increased by means of such reinforcing ribs. Compared with a uniform increase of a wall thickness of the carrying portion, material is thus saved while providing the same strength, and the weight of the holding device is also reduced.

The reinforcing ribs may be disposed so as to extend at least partially around the carrying portion. This causes as uniform an increase in strength as possible.

The fastening portion may have an assembly opening for accommodating a fastening and/or positioning means. A fastening means used in addition to the snap-in connection enhances the reliability and the load-bearing capacity of the connection to the vehicle. A positioning means simplifies a precise assembly of the holding device.

BRIEF DESCRIPTION OF THE DRAWINGS

The invention is explained in more detail below with reference to exemplary embodiments that are shown only schematically in the attached Figures. In detail, the Figures show.

DETAILED DESCRIPTION

Figure 1:
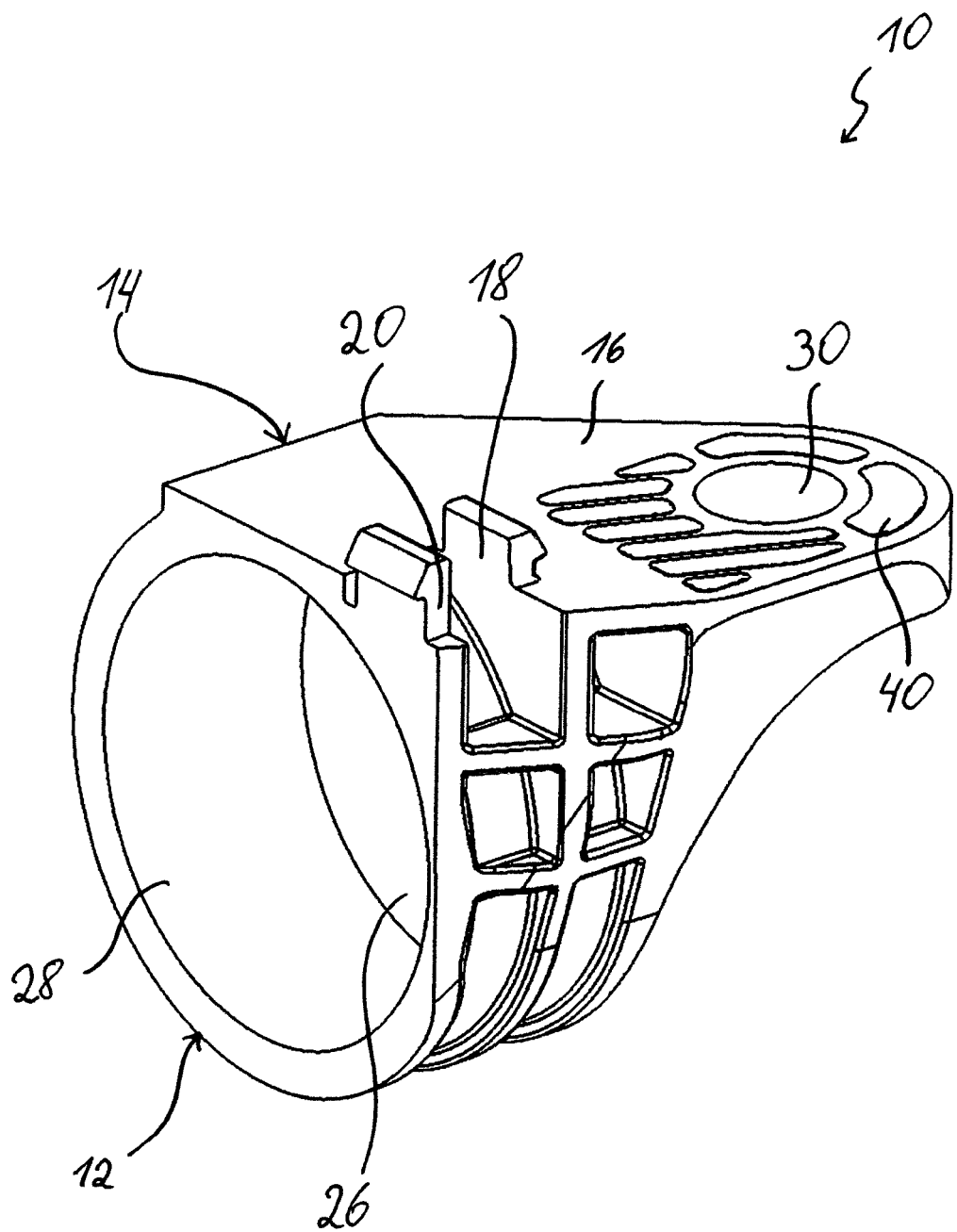
FIG. 1 shows a three-dimensional view of a holding device according to a first embodiment of the present invention.

A holding device 10 according to the present first embodiment has a carrying portion 12 and a fastening portion 14. A contact surface 16 adapted to the shape of a part of the vehicle to which the holding device 10 is to be attached is provided on the fastening portion 14. In the present embodiment, for example, a planar contact surface 16 is provided which is configured for abutting against an at least partially planar surface of the vehicle.

A first spring member 18 and a second spring member 20 are disposed so as to protrude from the fastening portion 14, which protrude from the fastening portion 14 in a perpendicular manner, for example. The spring members 18, 20 each have a substantially rectangular cross section and are oriented parallel to one another, for example. In this case, the spring members 18, 20 are oriented spaced apart from each other, for example.

For example, the carrying portion 12 is disposed on a side of the holding device 10 that faces away from the side on which the spring members 18, 20 are disposed. The carrying portion 12 is disposed around a, for example, circular opening 26 and defines the latter with an inner wall 28. For example, the opening 26 is suitable for accommodating a mounting device, e.g. an elastomer spring, with a supporting device.

Depending on the specific structural shape, the opening 26 may also have other cross sections, e.g. a square, rectangular or oval cross section.

In the present embodiment, the fastening portion 14 has an assembly opening 30. The assembly opening 30 may serve, for example, for passing therethrough a fastening means, or for accommodating a positioning pin.

For example, the holding device 10 is configured as a one-piece plastic part, which is manufactured, in particular, as an injection-molded article.

Figure 2:
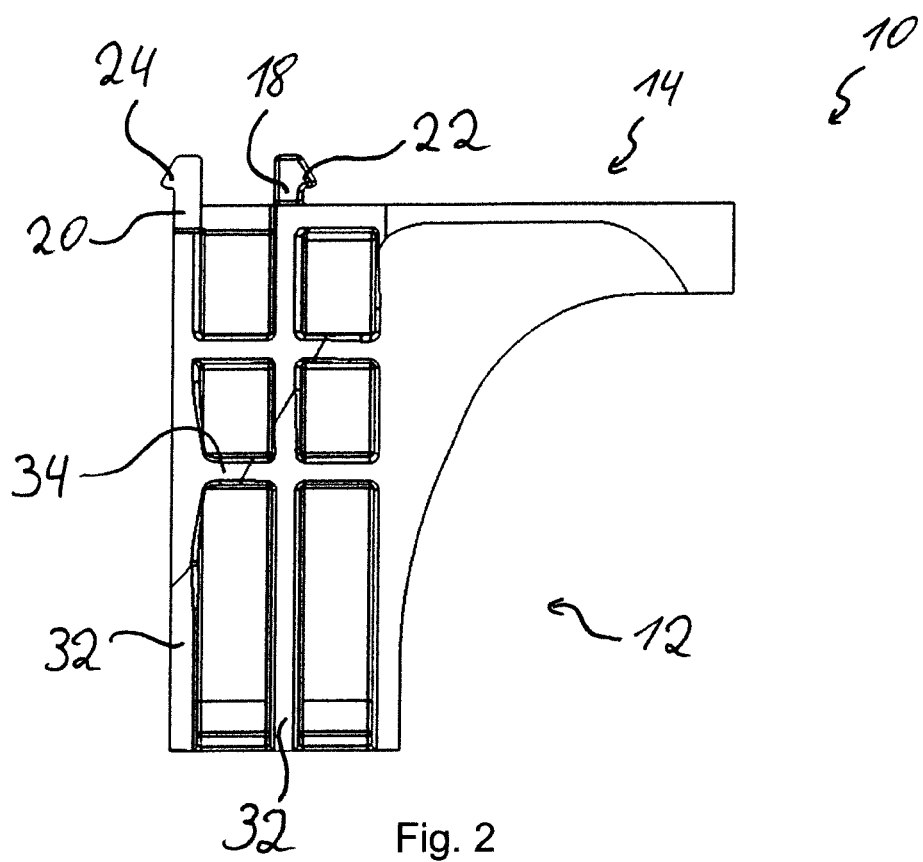
FIG. 2 shows a side view of the holding device according to FIG. 1.

As shown in FIG. 2, the spring members 18, 20 each have a snap-in hook 22, 24. For example, the snap-in hooks 22, 24 are disposed on sides of the two spring members 18, 20 that face away from each other, and have a tip each, wherein the tips of the two snap-in hooks 22, 24 point in opposite directions. The snap-in hooks 22, 24 may have oblique inserting portions for a simplified assembly. The oblique inserting portions may be inclined in different directions.

Figure 4:
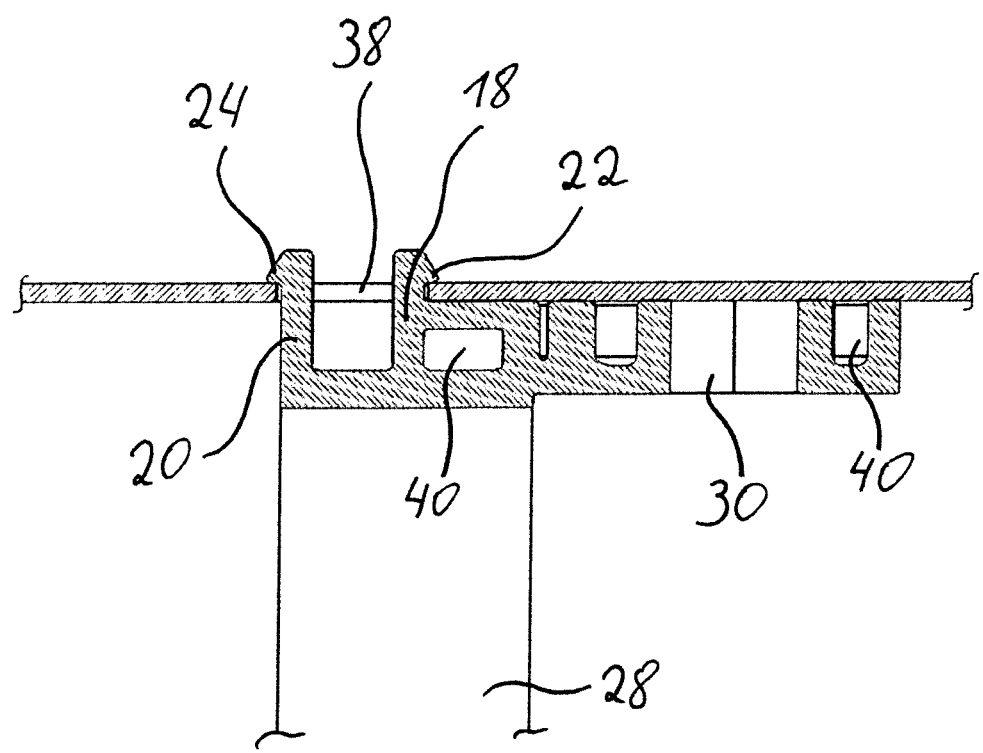
FIG. 4 shows a sectional view of the holding device according to FIG. 1 in an assembled state.

The first spring member 18 has a shorter height than the second spring member 20 (also see FIG. 4). The second spring member 20 is offset from the fastening portion 14 in such a way that, despite its greater height, it protrudes from the fastening portion 14 by substantially the same distance as the first spring member 18. By adapting the height of the second spring member 20, the leverage caused by the snap-in hook 24 disposed therein may be changed. The force required for separating the connection is thus set, and the recycling of the holding device 10 may thus be simplified.

The carrying portion 12 has reinforcing ribs 32 disposed on an outer face of the carrying portion 12. The reinforcing ribs 32 are disposed so as to extend around the carrying portion 12 and are connected to each other by transversal ribs 34.

Figure 3:
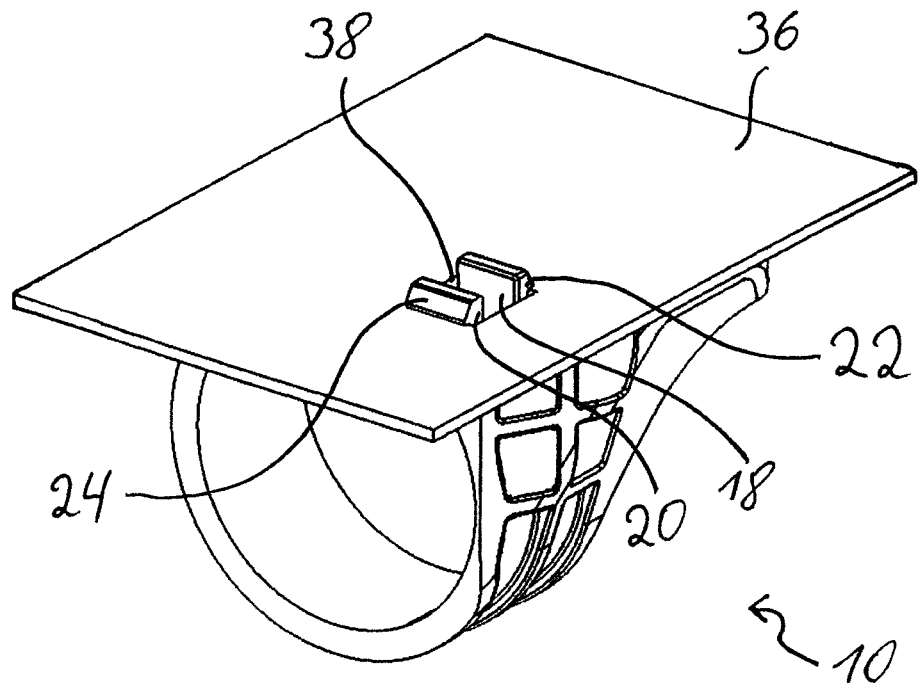
FIG. 3 shows a three-dimensional view of the holding device according to FIG. 1 in an assembled state.

In order to be fastened to an accommodation portion 36 of a vehicle, which is only schematically indicated in FIGS. 3 and 4, the holding device 10 is brought up to the accommodation portion 36 in such a way that the spring members 18, 20 are guided with the snap-in hooks 22, 24 through an accommodation opening 38 provided for this purpose. Due to the oblique inserting portions, the spring members 18, 20 are bent towards one another during the fastening process until the snap-in hooks 22, 24 have passed the accommodation opening 38. If the snap-in hooks 22, 24 have passed the accommodation opening 38, the spring members 18, 20 spring back into their original position due to their elastic force, to the extent the accommodation opening 38 permits this. The protruding snap-in hooks 22, 24 then block the removal of the holding device 10 from the accommodation opening 38. Thus, the spring members 18, 20 and the snap-in hooks 22, 24, together with the accommodation opening 38, form a snap-in or clip-in connection.

For the purpose of saving material, and in order to ensure a certain mechanical flexibility if necessary, the holding device may have various recesses 40. Some of these recesses 40 may be delimited by the reinforcing ribs 32 and the transversal ribs 34.

In the present embodiment, the spring members 18, 20 have a rectangular cross section. The spring members 18, 20 may have any cross section that permits a positive fit with respect to the accommodating opening 38 by means of which torques may be transmitted. Though prismatic shapes of the spring members 18, 20 are preferred, other designs, in particular with hooks protruding in cross section, are also conceivable.

For example, the present holding device 10 may be manufactured from a heat-resistant plastic. In particular, manufacturing may be carried out by means of a casting method.

Figure 5:
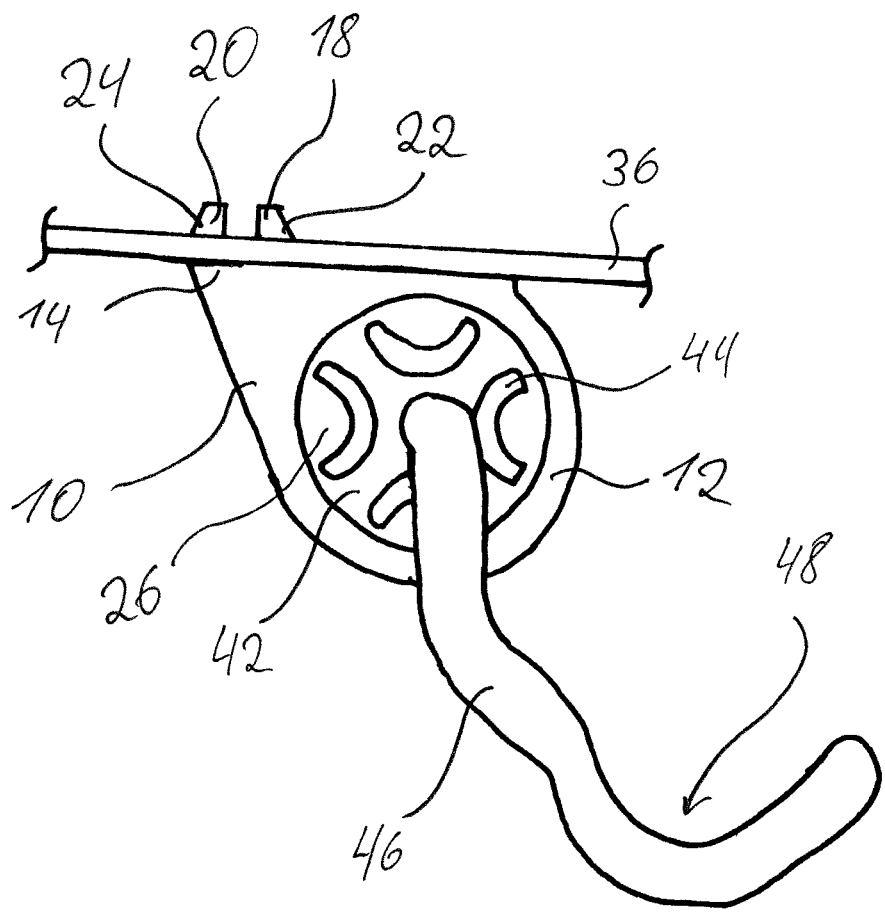
FIG. 5 shows a side view of a holding device according to a second embodiment of the present invention.

In the second embodiment of the holding device 10 shown in FIG. 5, an elastomer spring 42, which is attached by vulcanization to the carrying portion 12, for example, is already disposed in the opening 26. In order to adjust its properties, the elastomer spring 42 has recesses 44. For example, the recesses 44 are configured, in cross section, as an annular cut-out or crescent.

A supporting device 46, which has a support bracket 48 into which a exhaust pipe, for example, may be inserted, is vulcanized into the elastomer spring 42. Because the elastomer spring 42 is mechanically arranged between the supporting device 46 and the carrying portion 12, the supporting device 46 is decoupled from the carrying portion 12, and thus also from the accommodating portion 36 of the vehicle to which the holding device 10 is attached.

Advantageously, the present holding device 10 may be used for pre-assembly or assembly of an exhaust pipe. In addition, the present holding device 10 permits the orientation and positioning of the exhaust pipe for further assembly. Recycling is also simplified.

LIST OF REFERENCE NUMERALS

10 Holding device
12 Carrying portion
14 Fastening portion
16 Contact surface
18 First spring member
20 Second spring member
22 First snap-in hook
24 Second snap-in hook
26 Opening
28 Inner wall
30 Assembly opening
32 Reinforcing rib
34 Transversal rib
36 Accommodation portion
38 Accommodation opening
40 Recess
42 Elastomer spring
44 Recess
46 Supporting device
48 Accommodating bracket

The invention claimed is:

1. A holding device for retaining an exhaust pipe of an exhaust system via a mounted supporting device, the holding device comprising:

a carrying portion for accommodating the supporting device; and a fastening portion for fastening the holding device to a vehicle, wherein the fastening portion has a first spring member and a second spring member each with a snap-in hook for forming a snap-in connection, the first spring member having a smaller height than the second spring member;

wherein the second spring member is offset from the fastening portion such that it protrudes from a plane of a contact surface of the fastening portion by substantially the same distance as the first spring member, and the first spring member extends from a contact surface of the fastening portion, and the second spring member extends from below the contact surface.

2. The holding device according to claim 1, wherein the snap-in hooks of the spring members are oriented in opposite directions.

3. The holding device according to claim 1, wherein the spring members are oriented parallel to one another.

4. The holding device according to claim 1, wherein the spring members are disposed so as to protrude from the fastening portion on a side facing away from the carrying portion.

5. The holding device according to claim 1, wherein the carrying portion has an opening for accommodating the support device.

6. The holding device according to claim 5, wherein the opening has a circular cross section.

7. The holding device according to claim 1, wherein the carrying portion has reinforcing ribs on an outer face.

8. The holding device according to claim 7, wherein the reinforcing ribs are disposed so as to extend at least partially around the carrying portion.

9. The holding device according to any one of the preceding claims, wherein the fastening portion has an assembly opening for accommodating at least one of a fastener and a positioner.

10. The holding device according to claim 7, wherein the carrying portion has transversal ribs connecting the reinforcing ribs.

* * * * *